June 18, 1957 S. FRANKEL 2,796,222
COMBINATION SPEED CONTROL AND TORQUE CONTROL DEVICE
Filed June 16, 1955
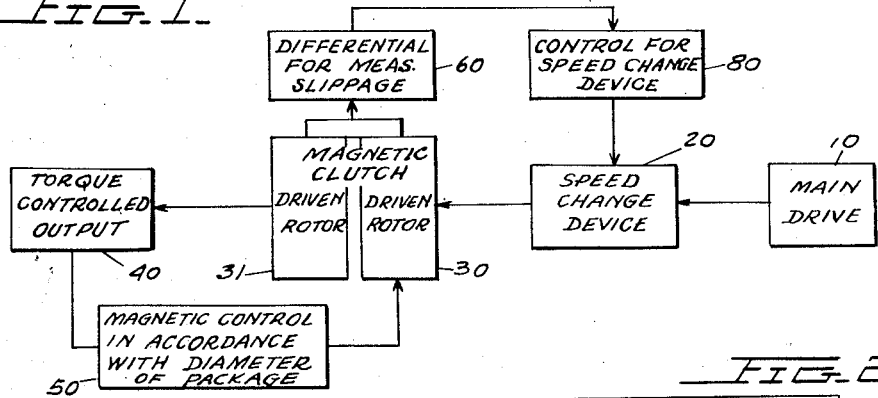
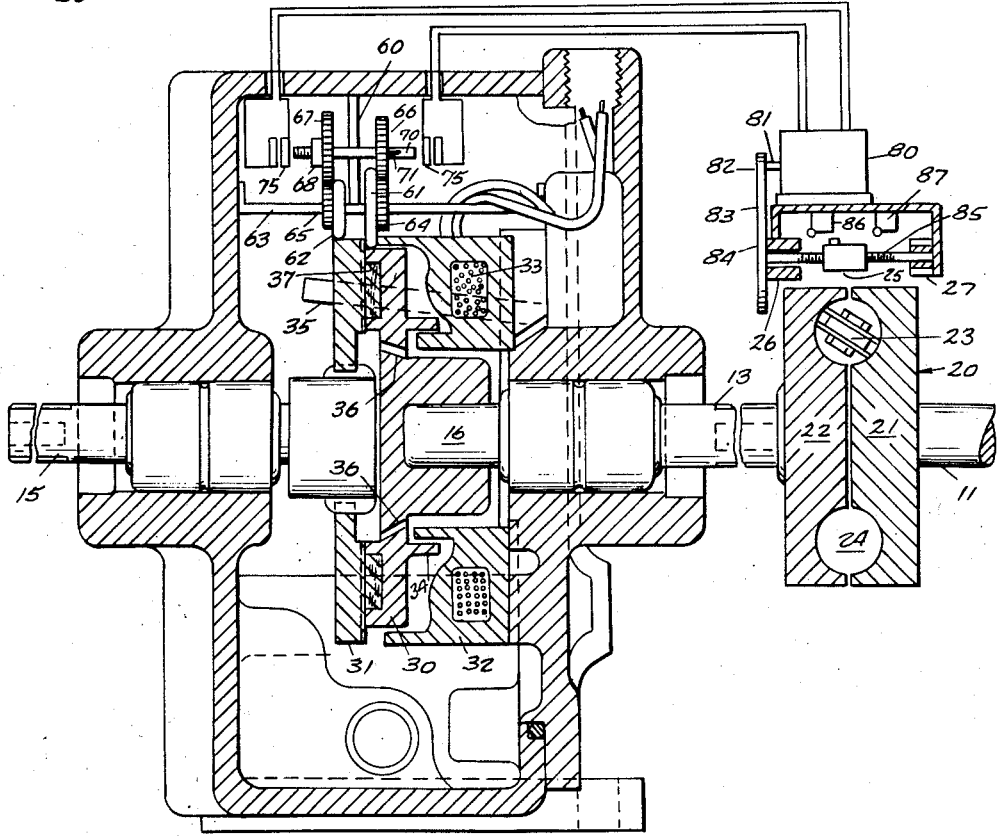
INVENTOR.
SYDNEY FRANKEL
BY
ATTORNEYS United States Patent Office 2,796,222
Patented June 18, 1957

2,796,222

COMBINATION SPEED CONTROL AND TORQUE CONTROL DEVICE

Sydney Frankel, Tenafly, N. J., assignor to Web Controls Corporation, New York, N. Y., a corporation of New York Application June 16, 1955, Serial No. 516,011

3 Claims. (Cl. 242—75)

This invention relates to a combination device for controlling the torque on a device being wound or unwound by means of a clutch or brake device and simultaneously controlling the speed of the parts which make up the clutch or brake device of the torque control means.

In a torque control center winding device when a package is being wound, for example, the package necessarily will have a slower angular speed as the size thereof increases but at the same time a greater torque must be applied to the core of the package to maintain a uniform pull on the material being wound since the leverage or distance between the axis of the package and the region where pull is applied is increasing. Thus when a magnetic clutch is employed for torque control the torque can be increased in accordance with the size of the package but the slippage between the clutch members must also be increased to a considerable extent. Since the slippage represents a total loss in energy and in wear on the parts it would be advantageous to reduce it to a minimum. Substantially the reverse effect occurs when a magnetic clutch is employed as a brake to control torque on a package being unwound.

Among the objects of this invention is to provide a magnetic torque controlled winding or unwinding device in which the slippage between the parts of the magnetic means is reduced to a minimum. In the specification and claims of this case it will be understood that the term "winding device" includes an unwinding device unless otherwise specified.

One problem in connection with the employment of magnetic clutches or brakes with the torque control devices is that of contacting surfaces of the clutch plates.

Among other objects of the invention is to provide a combination device for the torque controlled output to a winding device in which very little slippage occurs between the plates of the clutch device because the speed of the input shaft to the clutch is controlled so that the problem of keeping the clutch plates cool does not become serious.

The objects of the invention are accomplished by driving or braking the winding device by means of a torque controlled magnetic clutch or brake driven from a main drive shaft by means of a speed change device and simultaneously measuring the slippage between the clutch members and controlling the output of the change speed device to drive the clutch or brake by means of the measurement of the slippage between the clutch members whereby to reduce the slippage between the clutch members to practically any desired minimum.

The invention both as to its organization and its method of operation together with additional objects and advantages thereof will best be understood from the following description of specific embodiments thereof when read in connection with the accompanying drawing in which Fig. 1 is a flow diagram of the parts which make up the combination device.

Fig. 2 is a cross sectional view of a specific apparatus constructed in accordance with the invention.

Fig. 3 is a detail view of the differential device of Fig. 2 which measures the difference in the speed of the two rotors of the magnetic clutch or brake.

The principle of the invention is illustrated in the box diagram of Fig. 1. In the device a rotating package at 40 which is being wound or unwound is driven or being braked to produce a controlled uniform torque on the material being wound from a main drive 10. The torque control is obtained by means of the magnetic clutch or brake 30, 31. The device 30, 31 acts as a brake or clutch depending on the way in which it is used. Torque control is obtained by controlling the magnetic attraction between the rotors 30 and 31 as by a current control mechanism 50 in accordance with the size of the package or in accordance with distance that the layer being wound is from the axis of the winding device. Winding devices comprising a drive shaft, a magnetic clutch and some means 40 to control the torque applied by the magnetic clutch are known. A very satisfactory torque control device is that shown in my co-pending patent application Serial No. 508,884 filed May 4, 1955. In such devices the slippage between the clutch rotors 30 and 31 must increase as the package is being wound or unwound for the following reasons. If a package is being wound, the torque which must be applied to the axle to maintain a constant tension on the material being wound must increase as the package becomes larger because the tension on the material being wound is applied at a greater distance from the axis, at the same time the torque is being increased the speed of rotation of the package must be decreased if the material being wound is fed or is taken up at a constant linear speed. The only way in which these two effects can be obtained is by permitting greater slippage between the clutch members 30 and 31. The increase in slippage represents a loss of mechanical energy. This loss of energy comes out as heat losses which take place between the rotors of the magnetic clutch or brake and to maintain proper operation of the magnetic clutch the excess of heat generated by the friction between the clutch rotors must be withdrawn from the system. The required cooling step represents additional losses.

According to the present invention excessive friction between the clutch members 30 and 31 and excessive mechanical losses and/or cooling steps are avoided by inserting a change speed device 20 between the main drive 10 and the magnetic clutch or brake rotor 30 and by adding control devices 60, 80 which control the operation of the change speed device 20 in accordance with the difference in speed of rotation of the rotors 30 and 31. The control device 60 is a differential type of device adapted to measure the difference in the speed of rotation of the rotors 30, 31 and to react in a predetermined way to excessive differences in speed so as to operate a control 80 for the change speed device 20. The control 80 may comprise a reversible switch controlled motor or it may be only a mechanical device such as a lever.

In the device of Fig. 2, 11 is the input shaft and 15 is the output shaft. The input shaft drives the rotor 21 of the change speed device 20. The speed change device shown is of the "Erban" type wherein the rotor 22 is operatively connected to rotor 21 by means of three roller means 23 which are equally spaced within the toroidal opening 24 formed between the two rotors. In the drawing only one such connecting roller means 23 is shown the other two being spaced approximately 120° about the axis of the rotors. These speed change devices are known so that no detailed description is necessary. In operation movement of the control means 25 causes the rotor 23 to pivot within the toroidal opening 24 so as to change the speed at which rotor 22 is driven by rotor 21. For example if the rotor 23 is pivoted in a clockwise direction the speed of rotor 22 relative to rotor 21 will be decreased and vice versa. The rotor 22 drives shaft 13 which in turn is adapted to drive the shaft or axle 16 of the rotor 30 of the magnetic clutch.

Rotor 30 of magnetic clutch is surrounded by a ferromagnetic ring 32 which includes an electric coil 33 adapted to magnetize the said ring 32. This ring 32 approaches fairly close to the peripheral rim of rotor 30 on the one hand and fairly close to the annular flange 34 on the other hand. Rotor 30 may also contain a cork insert 37 of annular shape to provide for good contact between rotors 30 and 31. A very satisfactory clutch or brake device is one which is oil cooled which is shown in Fig. 2 and which is described in detail and claimed in my copending U. S. patent application Serial No. 468,692. In this device provision is made for positive oil flow through the contacting surfaces of the rotors 30 and 31. For example, oil collected in trough 35 from the splash of the housing is fed through openings to the central area between rotors 30 and 31 and thence through the space between the contacting area of the plates. The centrifugal force resulting from rotation of the rotors provides for the positive feed of the oil.

In the clutch or brake device 30 and 31 according to the invention a differential means 60 is provided. This differential means 60 comprises a roller 61 and a roller 62 freely mounted on a shaft 63 and adapted to be rotated by frictional contact with the periphery of rotors 30 and 31, respectively. Attached to roller 61 is the gear 64 and similarly a gear 65 is attached to roller 62. Gear 64 meshes with gear 66 and gear 65 meshes with gear 67. The gear ratio of gears 64, 66 and size of friction driven roller 61 is so proportioned to the gear ratio of gear 65, 67 and size of roller 62 so that when rotors 30 and 31 are driven at only a slightly different angular speed to allow for normal slippage between the rotors, then gears 66 and 67 will be driven at the same angular speed. If, however, the difference in speed between the rotors changes one of the gears 66 or 67 will be driven at a faster rate than the other.

When one of gears 66 or 67 is driven at a faster angular speed than the other what happens is best understood by reference to Fig. 3. The gear 67 may contain internal threads 69 and/or it may have the nut 68 attached thereto. The threads of nut 68 and/or the threads 69 of gear 67 are adapted to receive the external threads 72 at one end of the shaft 70. Shaft 70 includes a long slot 71 at the other end thereof and the shaft 70 is secured to rotate with gear 66 but to slide axially with respect to this gear by some such means as the spline 73. It can be seen that if gears 66 and 67 rotate at equal angular speeds the shaft 70 remains in the same axial position; however, if one gear 66, for example, rotates faster than gear 67, the shaft 70 will move in one axial direction depending on the direction of rotation, etc. Upon movement of the shaft 70 in one direction, to the right in Fig. 2 it establishes contact in the switch device 74 while movement in the opposite direction establishes contact with switch device 75.

In the device of Fig. 2, switches 74 and 75 are connected to reversible motor 80 so that the shaft 81 of this motor is driven in one direction or the other when switch 74 or 75 is connected. Shaft 81 is connected to pulley or gear 82 which is connected by belt 83 to gear or pulley 84. Pulley 84 is splined to shaft 85 which is rotatably mounted in bearings 26 and 27. Rotation of shaft 85 moves control 25 to the right or left as the case may be to slow down or speed up the rotation of rotor 22 and rotor 30. Safety switches 86 and 87 are provided to prevent the control 25 from moving too far to the left or right. When the slippage between clutch members 30, 31 is corrected or slightly over corrected, the shaft 70 will return to its normal position. Since the tendency is for the slippage between the clutch or brake rotors 30, 31 to gradually increase as a package is wound or unwound a slight over correction is not a disadvantage. The speed of the response to changes in speed of rotors 30, 31 can be varied by moving switches 74 and 75 closer to or further from the shaft 70.

In operation suppose it is desired to wind a roller of paper, for example, at a uniform linear speed and under uniform tension. Then the roller to be wound is driven from shaft 15 which in turn is driven from main drive shaft 11 through the change speed device 20 and magnetic rotors 30, 31 utilized as a magnetic clutch. At the start of the operation rotor 30 is necessarily driven at a slightly faster rate than rotor 31 since in any clutch device for regulating torque a certain amount of slippage is required to obtain the effect desired. As the roller being wound increases in size a greater amount of torque must be applied to it to provide for uniform tensioning of the paper since the paper is then at a greater distance from the axis of the roller but at the same time the rotor 31 must rotate at a slower angular speed because the package has a larger circumference. To increase the torque applied at 40 to the roller being wound, the magnetic attraction between rotors 30 and 31 is gradually increased by current control device 50 in known manner. It will be appreciated that the rate at which the magnetic attraction between rotors 30 and 31 is increased in the apparatus of the invention may not be identical with the rate at which the magnetic attraction is increased in devices where the slippage increases but this is merely a matter of adjustment of the control means and in applicant's device the rate of increase of torque can be made more precise where the amount of slippage between rotors 30 and 31 is maintained substantially constant throughout the winding cycle.

When the device of the invention is employed for controlling the rotation of a package which is being unwound substantially the reverse process takes place. A certain fixed minimum speed of rotation may be applied by the main drive 10, and this rotation is transmitted to rotor 30 by means of change speed device 20 while being automatically gradually increased by the change speed device as the slippage between rotors 30 and 31 becomes greater. In this instance the magnetic device 30, 31 acts as a brake.

It can be seen from the above description that the device of the invention provides for a minimum of slippage in the clutch or brake device 30, 31 while providing the desired torque control. Reduction of slippage between the elements of the clutch or brake reduces losses due to friction and provides for better regulation since the device is easily maintained at a substantially constant temperature and the reduction of slippage or frictional losses to a minimum also essentially reduces the requirements necessary for cooling or removing heat from overheated clutch or brake rotors.

The features and principles underlying the invention described above in connection with specific exemplifications will suggest to those skilled in the art many other modifications thereof. It is accordingly desired that the appended claims shall not be limited to any specific feature or details thereof.

I claim:

1. In a device for reducing slippage in a winding device comprising magnetically responsive rotors of the type wherein the torque applied to a package by a first of said rotors is gradually changed in accordance with the content of wound material on the package by changing the magnetic attraction between the first rotor and the second rotor which is positively driven so as to provide a substantially uniform tension to the material adjacent the wound material, the improved construction comprising means for driving said second positively driven rotor of the magnetic device through a change speed device, means for measuring the difference in the angular speeds of the first and second rotors of the magnetic device, means responsive to a change in the relative speeds of the first and second rotors of the magnetic device connected to said last named means, means for changing the relative speeds of the rotors of the speed change device, which includes a driven shaft and a drive shaft, means for changing the relative speed of the driven shaft of the speed change device with respect to the speed of the drive shaft, said means for measuring the difference in the angular speeds of the first and second rotors including means responsive to a change in the relative speed of the rotors to operate the means for changing the relative speeds of the shafts of the speed change device.

2. The device as set forth in claim 1 in which the means for changing the relative speed of the driven shaft of the change speed device with respect to the speed of the drive shaft thereof comprises a reversible motor and in which the means responsive to the change in the relative speed of the rotors of the magnetic device comprises a pair of electric switches.

3. In a winding device adapted to control the torque applied to the material adjacent the wound material of a rotating package, a magnetic clutch for controlling the torque applied to the material adjacent the rotating package, said magnetic clutch comprising a driving rotor and a driven rotor which is rotatable on an axis which continues in the same direction from the end of the axis of the driving rotor, said driving and driven rotors being unconnected except for a frictional engagement determined by the magnetic attraction therebetween, current control means for controlling the attraction between the driving and driven rotors in accordance with the size of the wound material of the package, speed control means connecting one of said driving and driven rotors to a driving shaft, means for sensing the degree of slippage between said two rotors, and means connecting the last named means to the speed control means whereby to maintain slippage between the rotors at a predetermined minimum.

References Cited in the file of this patent

UNITED STATES PATENTS

| | | |
|---|---|---|
| 2,317,290 | McIlvried | Apr. 20, 1943 |
| 2,483,751 | Bronander | Oct. 4, 1949 |

FOREIGN PATENTS

| | | |
|---|---|---|
| 867,794 | Germany | Feb. 19, 1953 |